US012680867B2

(12) United States Patent
Gómez Merchán et al.

(10) Patent No.: US 12,680,867 B2
(45) Date of Patent: Jul. 14, 2026

(54) LOW-POWER ASYNCHRONOUS SOLAR SENSOR

(71) Applicant: UNIVERSIDAD DE SEVILLA, Seville (ES)

(72) Inventors: Rubén Gómez Merchán, Seville (ES); Juan Antonio Leñero Bardallo, Seville (ES); Ángel Rodríguez Vázquez, Seville (ES)

(73) Assignee: UNIVERSIDAD DE SEVILLA, Seville (ES)

( * ) Notice: Subject to any disclaimer, the term of this patent is extended or adjusted under 35 U.S.C. 154(b) by 299 days.

(21) Appl. No.: 18/279,661

(22) PCT Filed: Mar. 4, 2022

(86) PCT No.: PCT/ES2022/070123
§ 371 (c)(1),
(2) Date: Oct. 28, 2024

(87) PCT Pub. No.: WO2022/184965
PCT Pub. Date: Sep. 9, 2022

(65) Prior Publication Data
US 2025/0155282 A1    May 15, 2025

(30) Foreign Application Priority Data
Mar. 4, 2021    (ES) ................................. P202130188

(51) Int. Cl.
*G01J 1/44* (2006.01)
*G01J 1/42* (2006.01)
(52) U.S. Cl.
CPC ......... *G01J 1/44* (2013.01); *G01J 2001/4266* (2013.01)

(58) Field of Classification Search
CPC ... G01J 1/44; G01J 2001/4266; G01S 3/7861; B64G 1/36
See application file for complete search history.

(56) References Cited

U.S. PATENT DOCUMENTS 5,324,929 A * 6/1994 Yamada ................. G01D 5/165
257/E31.115

OTHER PUBLICATIONS

Lenero-Bardallo et al. "A sun sensor implemented with an asynchronous luminance vision sensor", Conference Paper, 2017, pp. 67-70, ESSCIRC 2017—43rd IEEE European Solid State Circuits Conference.
Lenero-Bardallo et al., "Sun Sensor Based on a Luminance Spiking Pixel Array", Article, 2017, vol. 17, No. 20, pp. 6578-6588, IEEE Sensors Journal.

* cited by examiner

*Primary Examiner* — Thanh Luu
(74) *Attorney, Agent, or Firm* — Hayes Soloway PC

(57)                ABSTRACT

The invention relates to an asynchronous solar sensor, capable of calculating the relative position of the sun with respect to the centroid thereof, which comprises a very low-power pixel matrix, with N rows and M columns, with a photodiode working in a photovoltaic region in each pixel, wherein the pixels are connected in a common row line and a common column line; a pin-hole optics module, linked to the matrix, and comprising a hole through which a light passes, an illuminated region being generated on the matrix; and a processing module, connected to the common row line and to the common column line of the pixel matrix, configured directly to determine the centroid of the illuminated region.

2 Claims, 8 Drawing Sheets

LOW-POWER ASYNCHRONOUS SOLAR SENSOR

CROSS-REFERENCE TO RELATED APPLICATIONS AND PRIORITY

This patent application claims priority from International Patent Application No. PCT/ES2022/070123 filed Mar. 4, 2022, which claims priority from Spanish Patent Application No. P202130188 filed Mar. 4, 2021.

OBJECT OF THE INVENTION

The low-power asynchronous solar sensor of the invention is comprised within the discipline of physical technologies, particularly within the area of optical sensor microelectronics design in standard CMOS technology. Specifically, the invention proposes a new architecture for a high-speed and very low-power asynchronous solar sensor for the preferred use thereof in space navigation systems. The proposed architecture adapts to the operating requirements of satellites having small size and dimensions which use solar sensors to navigate through space, in addition to simplifying the additional hardware, required in applications of this type.

BACKGROUND OF THE INVENTION

Solar sensors are devices which serve to measure the relative position of the sun with respect to the centroid thereof. They are widely used in applications for gathering solar energy and space navigation. In the first scenario, the function of solar sensors is to position heliostats or solar panels based on the position of the sun. In applications for space navigation, solar sensors are for the purpose of detecting the position of the sun to enable obtaining a reference with which to navigate through space.

Reduction in the costs of building and launching satellites having small dimensions (micro- and nano-satellites) into orbit has increased the demand for solar sensors for space navigation. The satellites are cube-shaped and usually incorporate several solar sensors on their faces to detect the position of the sun even when some of them do not receive sunlight.

The specifications of solar sensors for space navigation are very demanding. They require: low latency for high-speed navigation; low power consumption, as the service life of a satellite is determined by power consumption; and reduced output data flow to simplify communication and operation with other sensors or actuators on the satellite. The state of the art relating to the implementation of solar sensors for space navigation is described below:

The dominant technology on the market uses digital solar sensors. FIG. 1 shows an elevational view (1) and a plan view (2) of a possible diagram of a solar sensor. These comprise a synchronous image sensor (3) with an APX (Active Pixel Sensor)-type pixel matrix (23), sensor optics (4), usually of the pin-hole type, and an opaque cover (5), which allow detecting the position of the sun at a specific viewing angle (6) of the sensor.

As shown in FIG. 2, depending on the position of the sun (9), a small region (8) of the pixels of the pixel matrix (23) is illuminated, as a result of a pin-hole optics (7). Then, the illumination values of all the pixels of the matrix (23) are read sequentially and synchronously. Next, the centroid of the illuminated region (8), i.e., of the fraction of the illuminated pixel matrix (23), is determined by means of an algorithm. Finally, the relative position of the sun (9) is determined by means of simple trigonometric calculations.

The described method has a number of inherent limitations. First, scanning all pixels of the matrix (23) entails long reading times. Most of the pixels are not illuminated and therefore do not provide useful information. Furthermore, the dark pixels in the illuminated region (8) of illuminated pixels must be processed to determine the centroid of the illuminated region (8). All this entails limited response time and unnecessary bandwidth and power consumption associated with the non-illuminated (dark) pixels.

To overcome these limitations, asynchronous solar sensors with autonomous pixels have been proposed recently. FIG. 3 shows an example of a well-known asynchronous solar sensor pixel architecture. In these architectures, there is a photodiode (11) operating in the reverse region, connected to a voltage comparator (12). The pixels generate voltage pulses (13) with a frequency proportional to the illumination to which they are exposed.

Its information is transmitted out of the pixel matrix (23) with an arbitration logic formed by several elements: reset transistor (10), row requests (14) for access to a shared output bus, approval signal (15) of the row access requests, column requests (16) for access to the shared output bus.

These asynchronous architectures have two advantages:

The first advantage is that all reading and processing times of the non-illuminated pixels (which are a large majority) are suppressed.

The second advantage is that, since the pixels are asynchronous and autonomous, it is not necessary to initiate a scanning period to read their outputs, which are directly provided by the pixels in a continuous manner.

Combining these two possibilities, response times and power and bandwidth consumptions that are much lower compared to digital solar sensors are achieved.

In the solar sensors with asynchronous architectures known to date, two limitations or areas of improvement are observed:

Their photodiodes (11) work in the reverse region of operation with a reverse current flowing from the cathode to the anode. In this region of operation, the photodiodes (11) consume energy in a manner proportional to the illumination values to which they are exposed.

Another limitation associated with existing asynchronous solar sensors is the fact that the computation of the centroid of the illuminated region (8), when all the illuminated pixels are taken into consideration, is performed by a microprocessor, FPGA, or processing circuitry external to the image sensor. This implies a higher complexity and resource consumption (power, area, and computational time) associated with the sensor.

No asynchronous solar sensors which solve the two aforementioned limitations have been disclosed to date.

DESCRIPTION OF THE INVENTION

The object of the present invention is an asynchronous solar sensor that allows measuring the relative position of its centroid with respect to the sun. The object of the present invention relates to an asynchronous solar sensor which allows measuring the relative position of the centroid thereof with respect to the sun. The sensor comprises a pixel matrix covered by a pin-hole camera-type optics module, such that when the sun illuminates the sensor, light rays go through the optics module, illuminating only a region of pixels of the matrix, the centroid of which allows calculating the position of the sun. Furthermore, the sensor comprises a processing module, connected to the pixel matrix, which collects a series of signals generated in the photodiodes and processes same.

Each of the pixels of the matrix comprises a photodiode, and it is very important to point out that the photodiodes are working in the photovoltaic region, like a solar cell.

As is known from the state of the art, photodiodes can work in photo-conductive mode, in which the photodiode is polarized inversely, i.e., a voltage is applied to bring the diode to the working zone where it does not conduct current. In reality, there is a very small current conduction referred to as saturation current. In the presence of light, the saturation current starts to increase, giving rise to the so-called photocurrent.

In contrast, in photovoltaic mode, the photodiode works like a photovoltaic cell, i.e., the illuminated photodiode generates a voltage that can be measured.

Therefore, since the photodiodes of the pixel matrix work in photovoltaic mode, the voltage appearing between the photodiode terminals is directly proportional to the illumination level and readily distinguishable between low and high illumination conditions.

By comparing the voltage appearing in the photodiode with an electronically configurable threshold, the pixel can take two values: illuminated or not illuminated, such that the illuminated pixels will activate a column signal and another row signal to indicate to the processing module that the pixel in said address is illuminated.

When an ideally circular region of the pixel matrix is illuminated, the processing module will have as input a series of contiguous activated rows/columns, its objective being to calculate the central row and column, the only data which is communicated to the outside.

This means a considerable decrease in the data communicated to the outside (since neither addresses that are not of interest, nor their illumination level, are communicated), greatly increasing the acquisition speed and reducing the use of hardware.

The asynchronous solar sensor therefore allows solving the problems raised in the state of the art as a result of:

asynchronous pixels that use photodiodes operating in the photovoltaic region. In this way, instead of consuming power, they generate it, contributing to the reduction of overall consumption of the solar sensor, and addition of a simple processing module, incorporated to the pixels and the periphery of the solar sensor, which allows the solar sensor to directly provide the coordinates of the most illuminated pixel of the matrix, which must be the one closest to the centroid to be located.

Therefore, an asynchronous solar sensor architecture which offers two advantages over all known asynchronous solar sensors is proposed: reduction of power consumption through operation with the diodes in the photovoltaic region and provision of simple processing circuitry to the sensor to calculate the centroid of the illuminated region within the sensor itself.

DESCRIPTION OF THE DRAWINGS

To complement the description that is being made and for the purpose of helping to better understand the features of the invention according to a preferred practical exemplary embodiment thereof, a set of drawings is attached as an integral part of said description in which the following is depicted in an illustrative and non-limiting manner.

PREFERRED EMBODIMENT OF THE INVENTION

A preferred embodiment of the asynchronous solar sensor, object of the present invention, which allows measuring the relative position of the centroid thereof with respect to the sun (9) is described below with the help of FIGS. 1 to 8. Sensors of this type are extremely useful in space applications, where the sun is used as a reference when orienting the aircraft.

Figure 2:
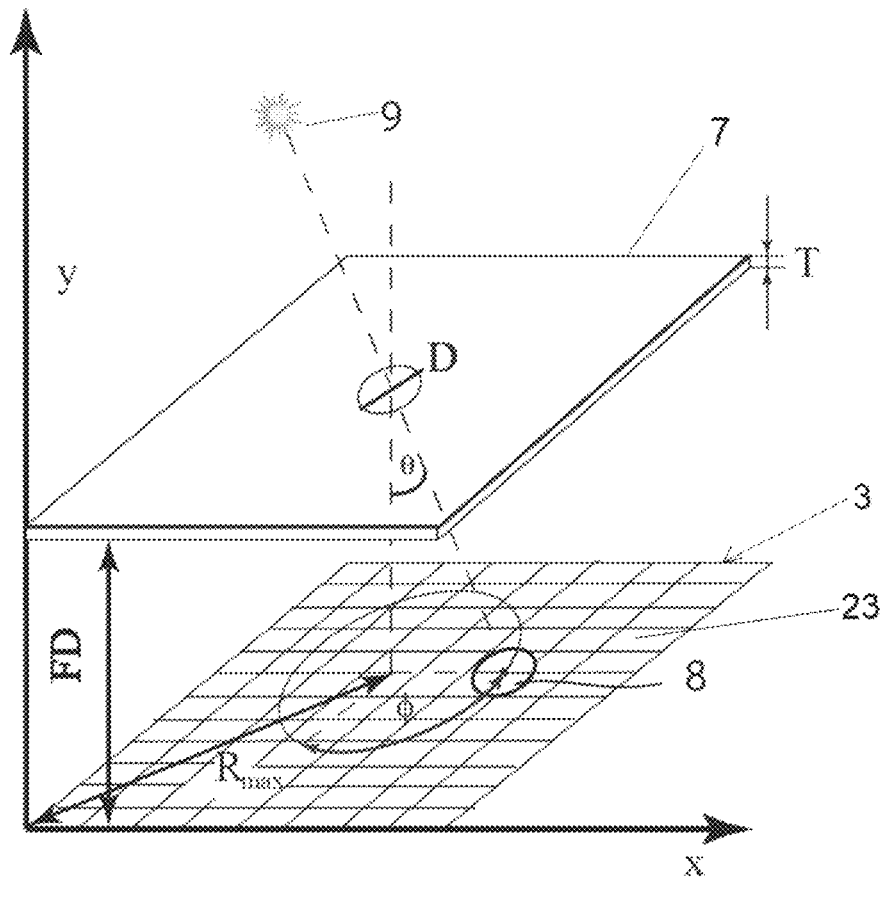
FIG. 2 shows the pin-hole type optics used in the state of the art, as well as the projection of the sun on the pixel matrix.
Figure 3:
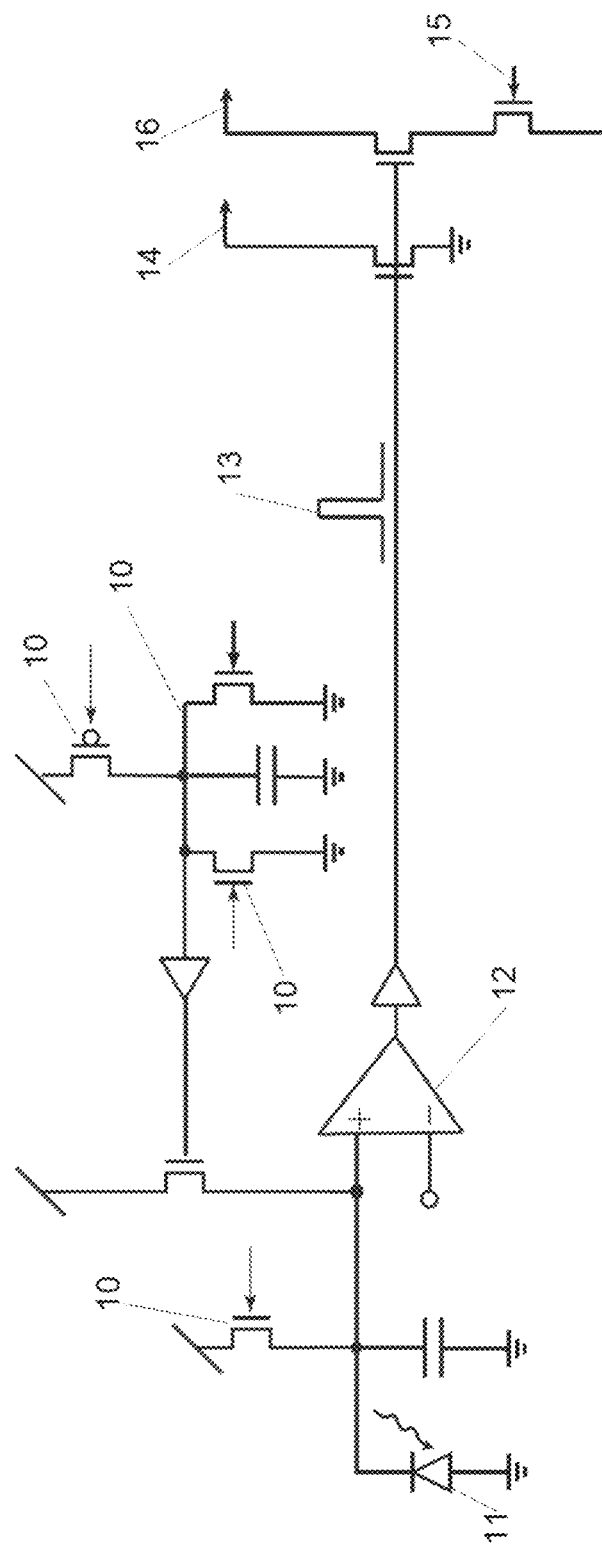
FIG. 3 shows an example of an asynchronous solar sensor architecture of the state of the art.
Figure 4:
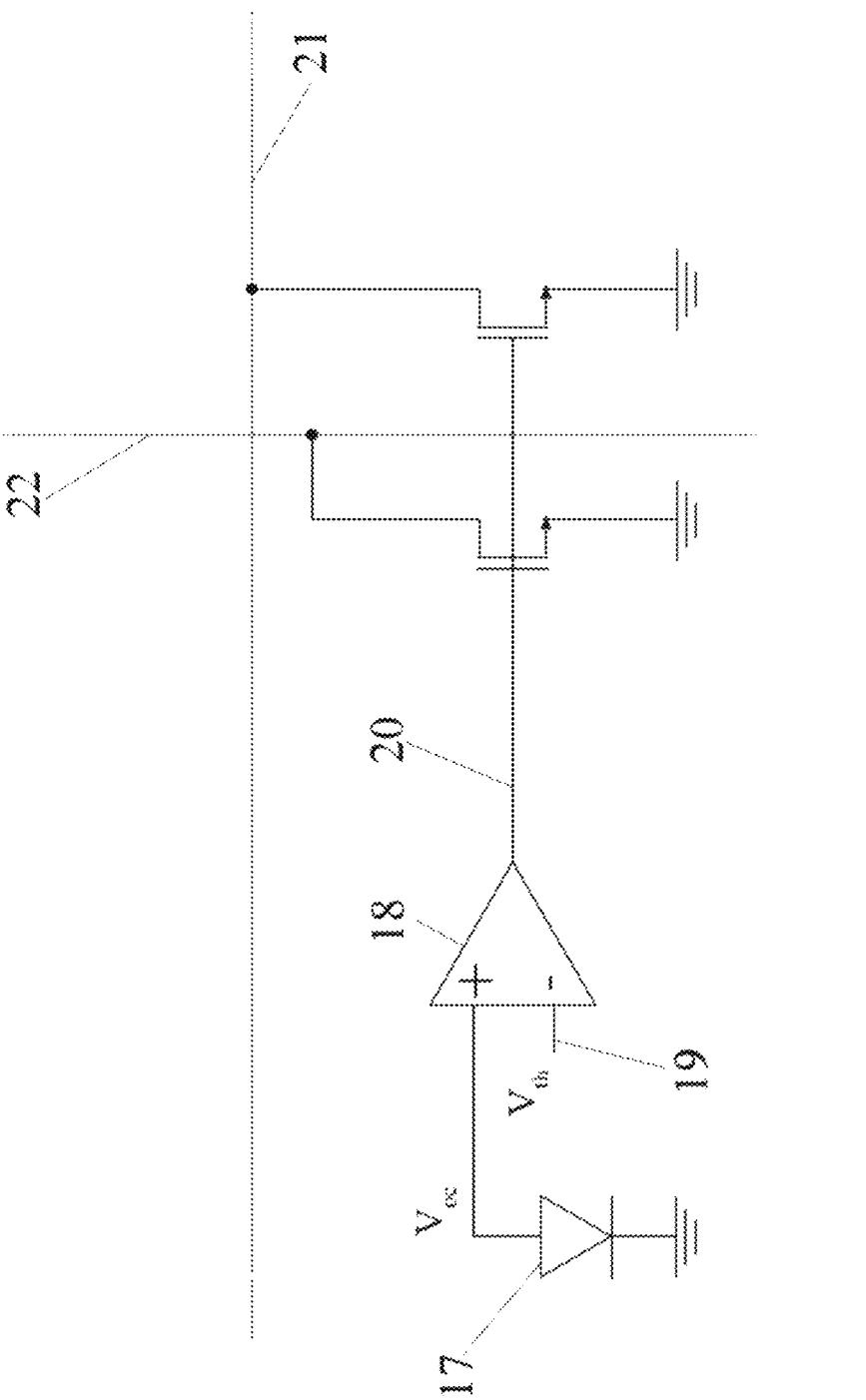
FIG. 4 shows a diagram of the pixel, containing a photodiode, a comparator, and two transistors.

To that end, the sensor comprises a pixel matrix (23), such as the one shown in FIG. 2, these being identical N×M, preferably N×N, pixels. A pin-hole camera type optics module (7) with an aperture (D) in a central area is arranged positioned on the matrix, such that it is between the pixel matrix (23) and the sun (9). When light from the sun (9) goes through the optics module (7), an illuminated region (8) is generated on the pixel matrix (23), the position of which depends on the position of the sun (9).

Figure 1:
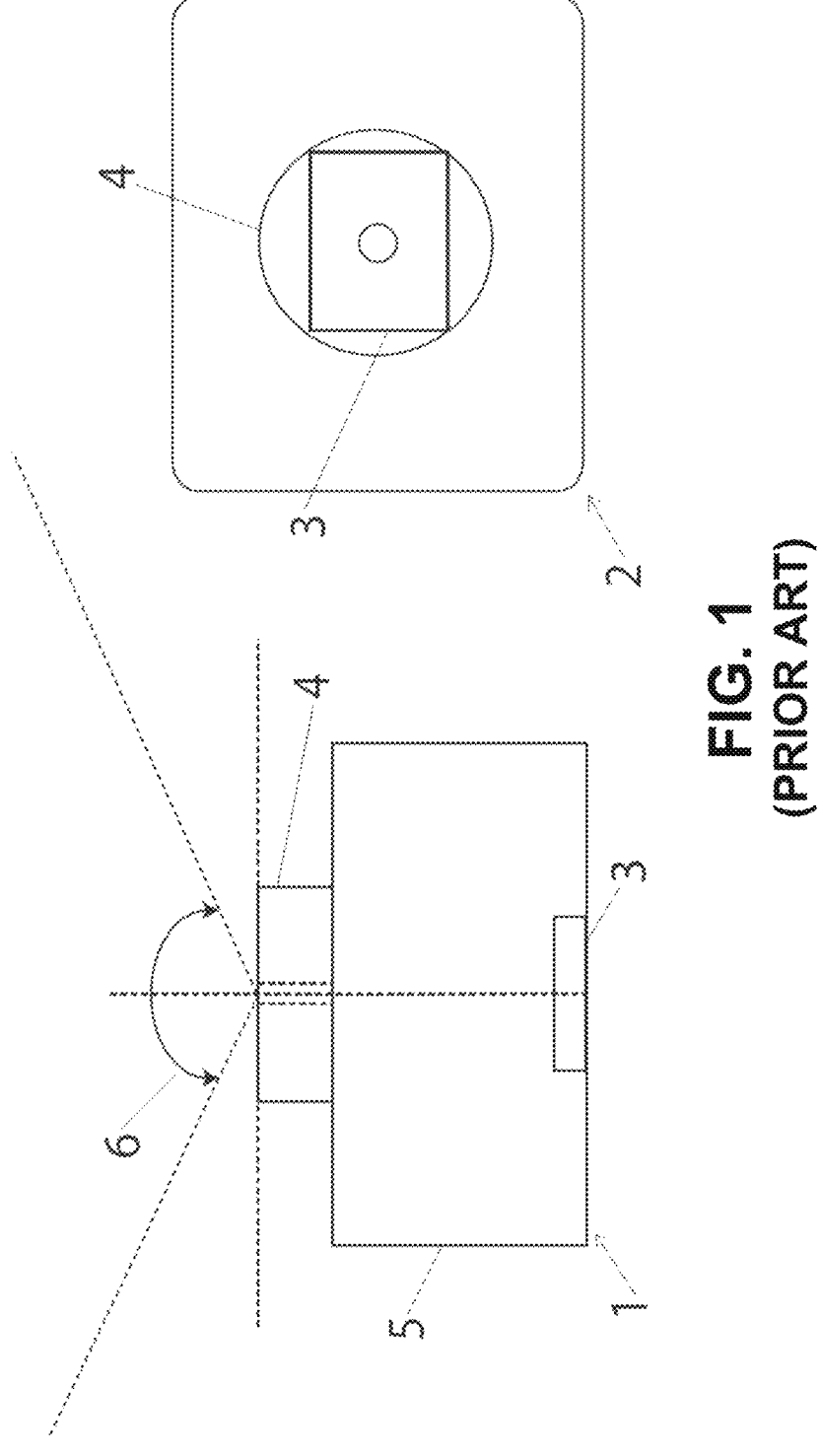
FIG. 1 shows an example of a solar sensor of the state of the art based on an APS (Active Pixel Sensor) image sensor.

As shown in FIGS. 1 and 2, an opaque cover (5) can be placed around the pixel matrix (23) and the optics module (7) on the upper part of the opaque cover (5), on a face opposite the pixel matrix (23). In this way, only a small region of the pixel matrix (23) is illuminated, as shown in FIG. 2, allowing the calculation of the relative position of the sun (9) by knowing the center of said illuminated region (8).

The pixels of the pixel matrix (23) are connected in a common row line (21) and in a common column line (22). Each of the pixels of the matrix (23) comprises a photodiode (17) working in a photovoltaic region, which allows considerably reducing sensor consumption.

When an illuminated photodiode (17) is operating in the photovoltaic region, a photocurrent which causes the appearance of a potential difference between the terminals thereof is generated, to the point where the diffusion current cancels the drift current. The voltage of this point is known as open circuit voltage ($V_{oc}$), since it is the voltage which appears when there no connected load, which is directly proportional to the level of illumination.

Since a solar sensor seeks to differentiate regions which are illuminated (due to the sun) from those which not illuminated in the matrix (23), each of the pixels comprises an output which takes a high value when the photodiode (17) is considered as being illuminated and vice versa. To that end, the circuit of FIG. 4 has been used.

Knowing that the open circuit voltage of the photodiode (17) takes values close to 0 V, when it is not illuminated, and up to about 0.5 V, when it is highly illuminated, its cathode is connected to ground and its anode to a comparator (18), an element which decides if the generated voltage is greater than an electronically configurable threshold voltage ($V_{th}$) (19). The output of the comparator (20) is used to write in the common row line (21) and in the common column line (22), indicating to a processing module that the pixel of the pixel matrix (23) corresponding to said address is illuminated.

The common row lines (21) and the common column lines (22) are, by default, at a high logic level, through a pull-up transistor external to the pixel matrix (23), transitioning to a low level when the open circuit voltage of the photodiode (17) of any pixel of the corresponding row or column exceeds the threshold voltage ($V_{th}$) (19) of the comparator (18), indicating that there is an illuminated pixel in said coordinate. Since the pixel works continuously over time, latency between measurements is considerably reduced.

The use of a type of pixel such as the one described above in an asynchronous solar sensor entails, first, a reduction in the amount of data communicated to the outside, since only the coordinates of the illuminated pixels are extracted, with having to extract their level of illumination, with the subsequent increase in sensor speed.

However, the only pixel that contains information is the one located in the center of the circular region (8) that is the most illuminated (centroid), so extracting the address of all the pixels around same would involve unnecessarily increasing the computational load, since all this redundant data would have to be stored and subsequently processed, which in turn increases the latency of the process.

This does not only entail an increase in hardware complexity, but also compromises the implementation of the sensor in space applications, since it is impossible to use any type of hardware, as it is being constantly subjected to radiation.

To solve this problem, the information is pre-processed in the sensor itself, but in an efficient manner. Instead of having a circuitry capable of extracting the position of all the illuminated pixels to calculate their centroid, a processing module capable of directly extracting the position of the centroid has been used.

Figure 5:
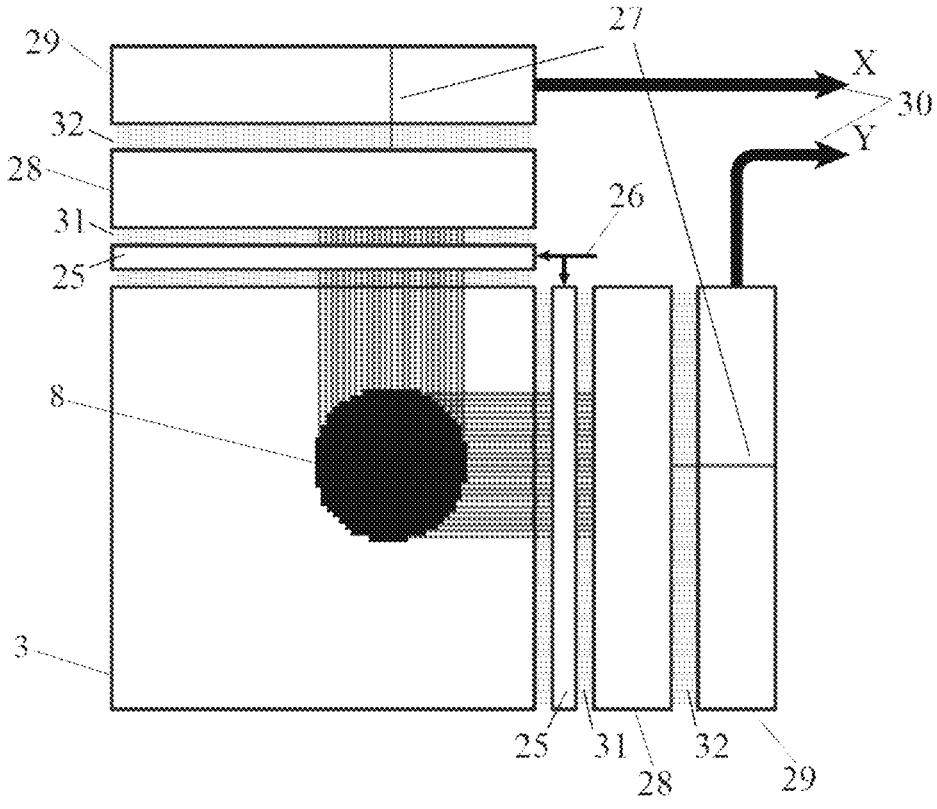
FIG. 5 shows an embodiment of the sensor, which comprises a pixel matrix, memories, a filtering periphery, and an encoder.

As shown in FIG. 5, the processing module comprises one or more memories (25), connected to the pixel matrix (23), preferably a row memory (25) and another column memory of the pixel matrix (23). From same there are extracted the addresses of a set of rows and columns at a high level which define the illuminated region (8), and are stored in the memories (25) when a capture signal (26) is activated.

The memories (25) capture the value of the addresses of the illuminated pixels following the rising edge of the capture signal (26), in order to prevent failures in the processing module, as a result of the continuous operation of the pixel matrix (23).

The captured values must be the input for filtering blocks (28), connected to the memories (25), comprising an input (31) for receiving the captured values, and an output (32) through which the coordinate of a single active row or column, respectively, corresponding to the coordinates of the central pixel of the illuminated region (8) (centroid) is communicated. To that end, the filtering blocks (28) filter the central row and column (27) of the set of rows and columns at a high level, as shown in FIG. 5. Like in the case of the memories (25), the processing module preferably comprises a filtering block (28) for the rows and another filtering block for the columns.

Figure 6:
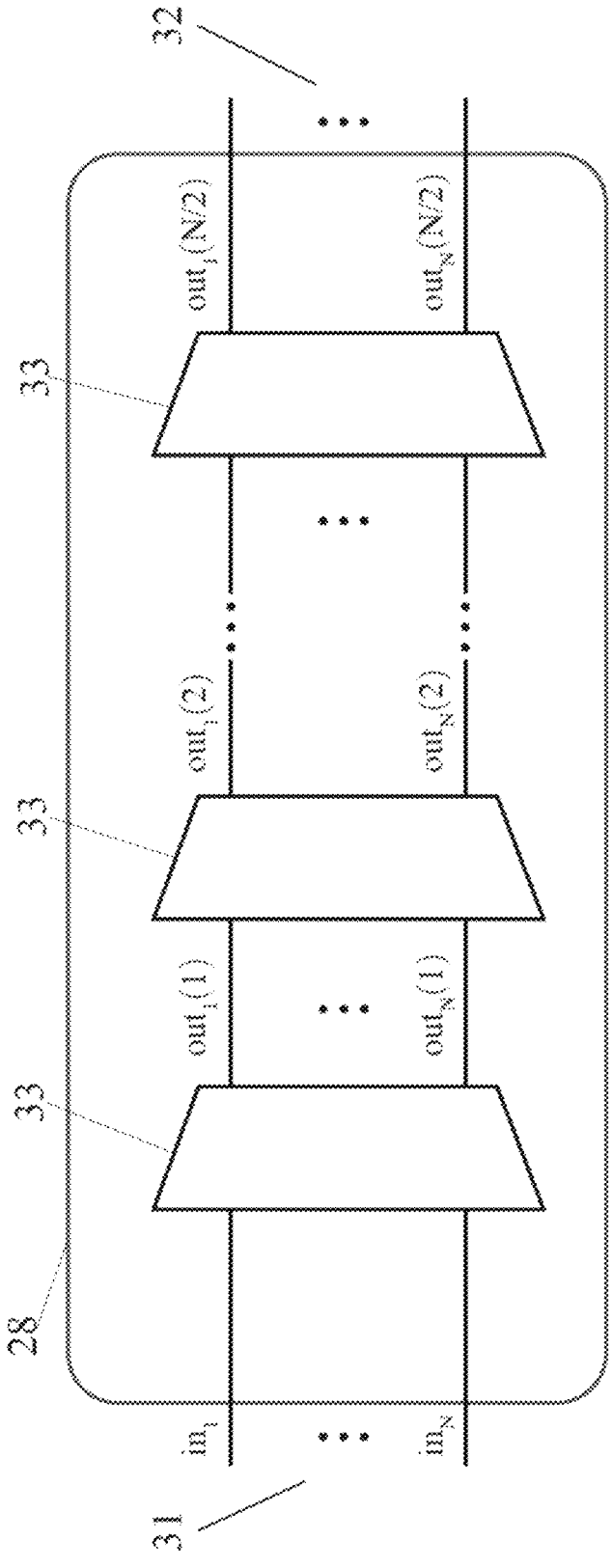
FIG. 6 shows the interconnection of filtering steps in the filtering block.

Given that two rows and two columns are eliminated in each filtering step (33), the number of filtering steps (33) required to obtain a single active row and column at the output will be given by the size of the illuminated region (8) that may appear, which will depend greatly on the type of optics used. The most unfavorable case is when the entire matrix is illuminated, requiring N/2 filtering steps (33) for a matrix (23) of N×N pixels, as shown in FIG. 6. Each of these filtering steps (33) is capable of eliminating the edges of the set of rows or columns, i.e., those active rows or columns neighboring non-activated rows or columns.

Figure 7:
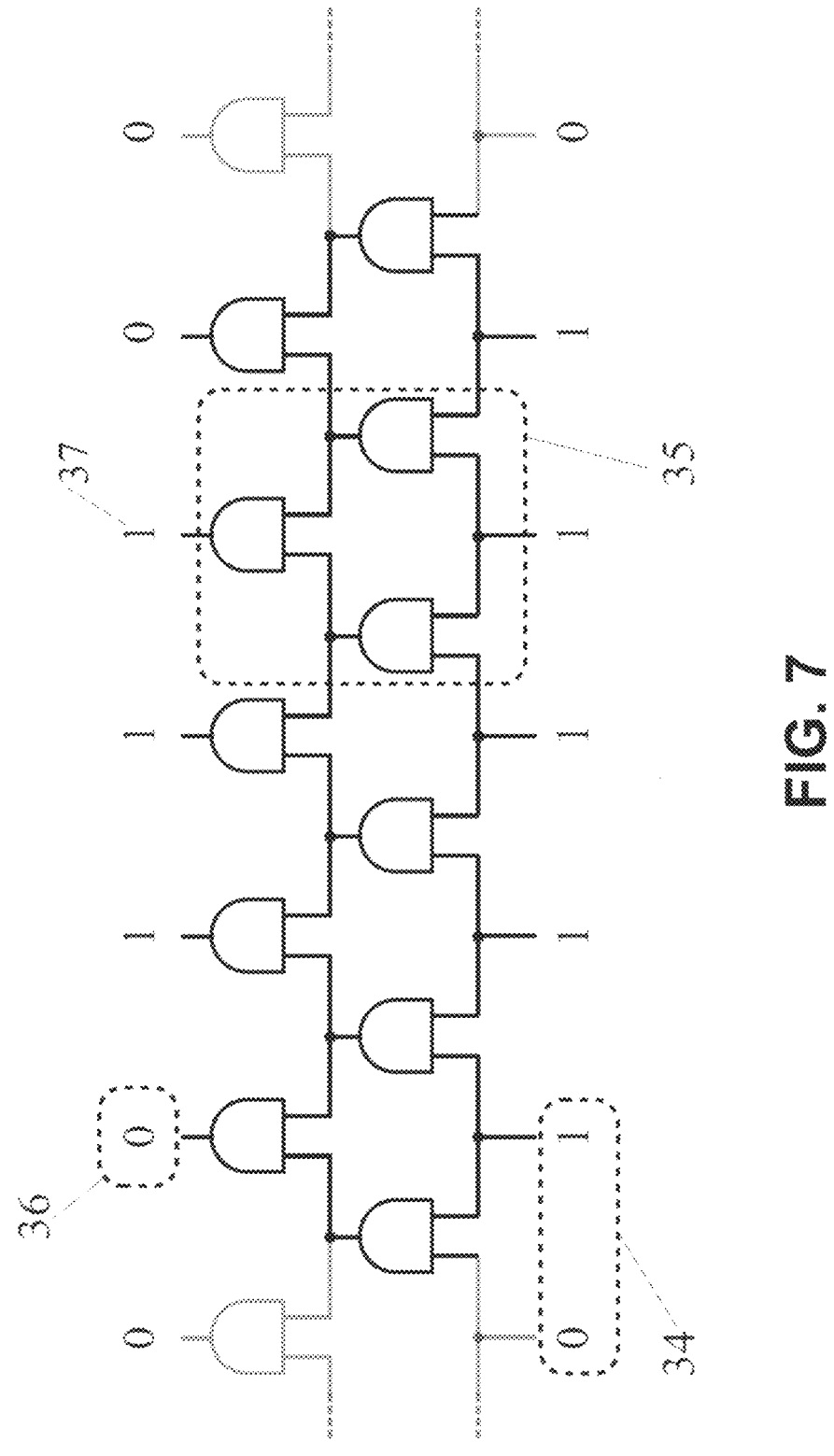
FIG. 7 shows the circuitry used in each of the filtering steps.
Figure 8:
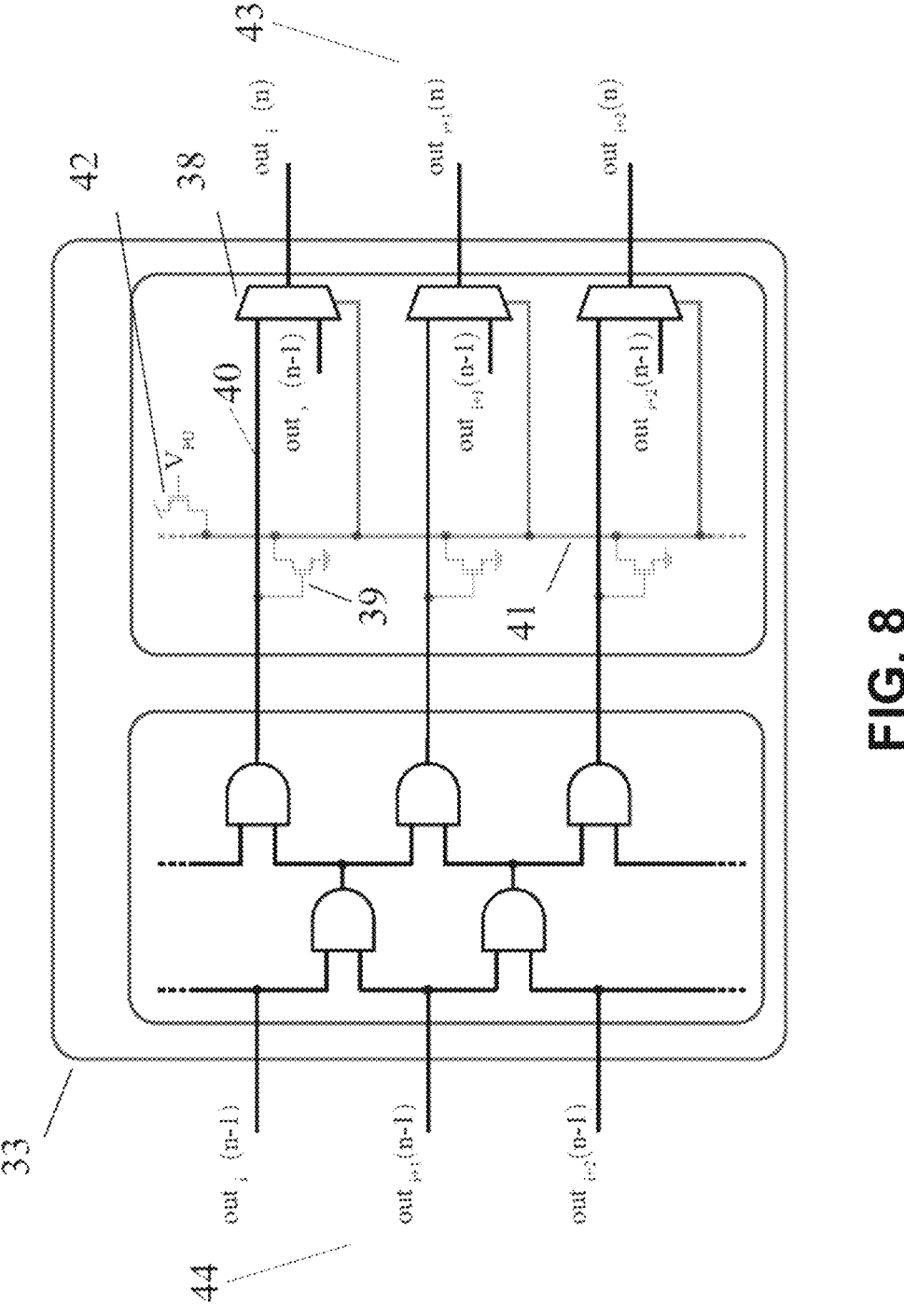
FIG. 8 shows the multiplexer used in each filtering step.

As shown in FIG. 7, filtering is performed by means of the AND operation with the preceding and subsequent row or column, which defines a unit cell (35). Therefore, the output of one of the filtering steps (33) will contain a single active row or column, which must be transferred to the output of the complete filtering block (28).

However, when the input of a filtering step (33) contains a single row/column at a high level, none of its outputs is activated, since it interprets this row/column as an edge. Therefore, since the size of the illuminated area (8) may vary during operation, the output (32) of the filtering block (28) must correspond to the output of the last filtering step (33) of an active row/column.

To that end, the filtering block (28) comprises a multiplexer (38) at the output of each filtering step (33), controlled by the NOR operation of the set of outputs, which is performed through respective transistors (39) activated by each of the outputs of the AND gates (40), which are in charge of placing at a low level a common step signal (41) which, by default, is at a high level through a duly polarized pull-up transistor (42). In this way, if at least one of the outputs of the AND operations (40) of said filtering step (33) is active, they pass to the output (43), if not, the output of the preceding filtering step (44) is bypassed, which would reach the output of the filtering block (32).

Finally, the processing module comprises encoders (29), shown in FIG. 5, connected to the filtering blocks (28), which perform the binary conversion of the resulting row and column, obtaining coordinates, which are sent through an output (30), intended to be connected to a device external to the sensor. Preferably, the processing module comprises an encoder (29) for the rows and another encoder for the columns.

In this way, the only data extracted from the sensor are the coordinates of the pixel which corresponds to the centroid (27), eliminating the need of any post-processing beyond the calibration of the sensor itself and reducing the hardware required in the system which uses the sensor, a fundamental requirement in space applications.

It is also important to highlight that if there were two active rows or columns, both would be treated as edges and filtered, so the output of the filtering block (32) can possibly be a set of two rows or columns instead of one. In said case, the encoders (29) discard one of them.

Furthermore, if there is more than one illuminated area (8), the output of the processing module will be the center of the largest area, since the filtering itself would eliminate the small spurious areas that may appear. Moreover, if there is a light source other than the sun (such as the Earth's albedo in space application) capable of illuminating an even larger area, the configuration of the threshold of the comparator (19) would allow the pixel matrix (23) itself to only communicate the area with a greater illumination to the filtering block (28).

The invention claimed is:

1. An asynchronous solar sensor, comprising:

a pixel matrix comprising N rows and M columns of pixels, a common row line, a common column line and a plurality of comparators connected to the common row line and to the common column line wherein each pixel comprises a photodiode, working in the photovoltaic region, which comprises an anode and generates a voltage when illuminated, and wherein the comparators are connected to the anode of each photodiode and are configured to determine whether the voltage generated in each photodiode is greater than a threshold voltage, a pull-up transistor, connected to the common row line and to the common column line, configured for maintaining them at a high logic level and for transitioning to a low logic level when the voltage of at least one photodiode of the corresponding row or column exceeds the threshold voltage of the comparator connected to said photodiode, a pin-hole optics module, comprising a hole through which an external light passes and configured to generate with said external light an illuminated region on the matrix, and a processing module, connected to the common row line and to the common column line, and comprising:

one or more memories, connected between the common row line and the common column line, and configured to store a signal from the common row line and the common column line of coordinates of the illuminated pixels which exceed the threshold voltage, and filtering blocks, connected to the memories, and comprising an input, for receiving coordinates of the illuminated pixels which exceed the threshold voltage, and an output, for outputting coordinates of a pixel positioned in a centroid of the illuminated region.

2. The sensor according to claim 1, wherein the processing module further comprises one or more encoders connected to the filtering blocks.

* * * * *